United States Patent [19]

Flanagan

[11] 4,116,893

[45] Sep. 26, 1978

[54] IMPACT ENERGY-ABSORBING URETHANE FOAM

[75] Inventor: Kirby E. L. Flanagan, Rochester, N.H.

[73] Assignee: McCord Corporation, Detroit, Mich.

[21] Appl. No.: 746,826

[22] Filed: Dec. 2, 1976

Related U.S. Application Data

[63] Continuation-in-part of Ser. No. 481,498, Jun. 21, 1974, abandoned.

[51] Int. Cl.$^2$ ............................ C08G 18/63; C08G 18/65
[52] U.S. Cl. .................................... 521/137; 264/45.5; 264/46.6; 264/46.8; 264/DIG. 14; 293/71 P; 428/425; 521/159; 521/167; 521/176
[58] Field of Search .................. 260/2.5 BE, 2.5 AM, 260/2.5 AZ

[56] References Cited

U.S. PATENT DOCUMENTS

| | | | |
|---|---|---|---|
| 3,632,707 | 1/1972 | Rice | 260/2.5 AZ |
| 3,795,636 | 3/1974 | Nuffmani | 260/2.5 AZ |
| 3,876,569 | 4/1975 | Priest | 260/2.5 BE |
| 3,907,721 | 9/1975 | Gurgiolo | 260/2.5 AM |
| 3,926,867 | 12/1975 | Quock | 260/2.5 AM |
| 3,939,106 | 2/1976 | Dunleavy | 260/2.5 AM |
| 4,007,139 | 2/1977 | Gurgiolo | 260/2.5 AM |
| 4,020,001 | 4/1977 | White | 260/2.5 AZ |
| 4,065,410 | 12/1977 | Schäfer | 260/2.5 AZ |

Primary Examiner—C. Warren Ivy
Attorney, Agent, or Firm—McGlynn and Milton

[57] ABSTRACT

An impact energy-absorbing, relatively low density, urethane foam for use in automobile bumpers has a high content of urea linkages and is relatively temperature insensitive, i.e. gives approximately the same physical performance over a wide range of temperature. The foam is water blown in a closed mold from a quasi-prepolymer system. The pack factor is preferably in the range of 1.5 to 8 and the molded density is in the range of 5 to 20 lbs./ft.$^3$.

The foam formulation is based on a polyol of a poly (oxypropylene/ethylene) triol reacted with a styrene/acrylonitrile monomer mixture which triol thus modified is reacted with (1) a 50 to 150 equivalent weight polyol cross linker of 2 to 6 functionality, (2) a MDI or TDI/-glycol or triol quasi-prepolymer and (3) some water.

3 Claims, 1 Drawing Figure

U.S. Patent　　　　　Sept. 26, 1978　　　　　4,116,893
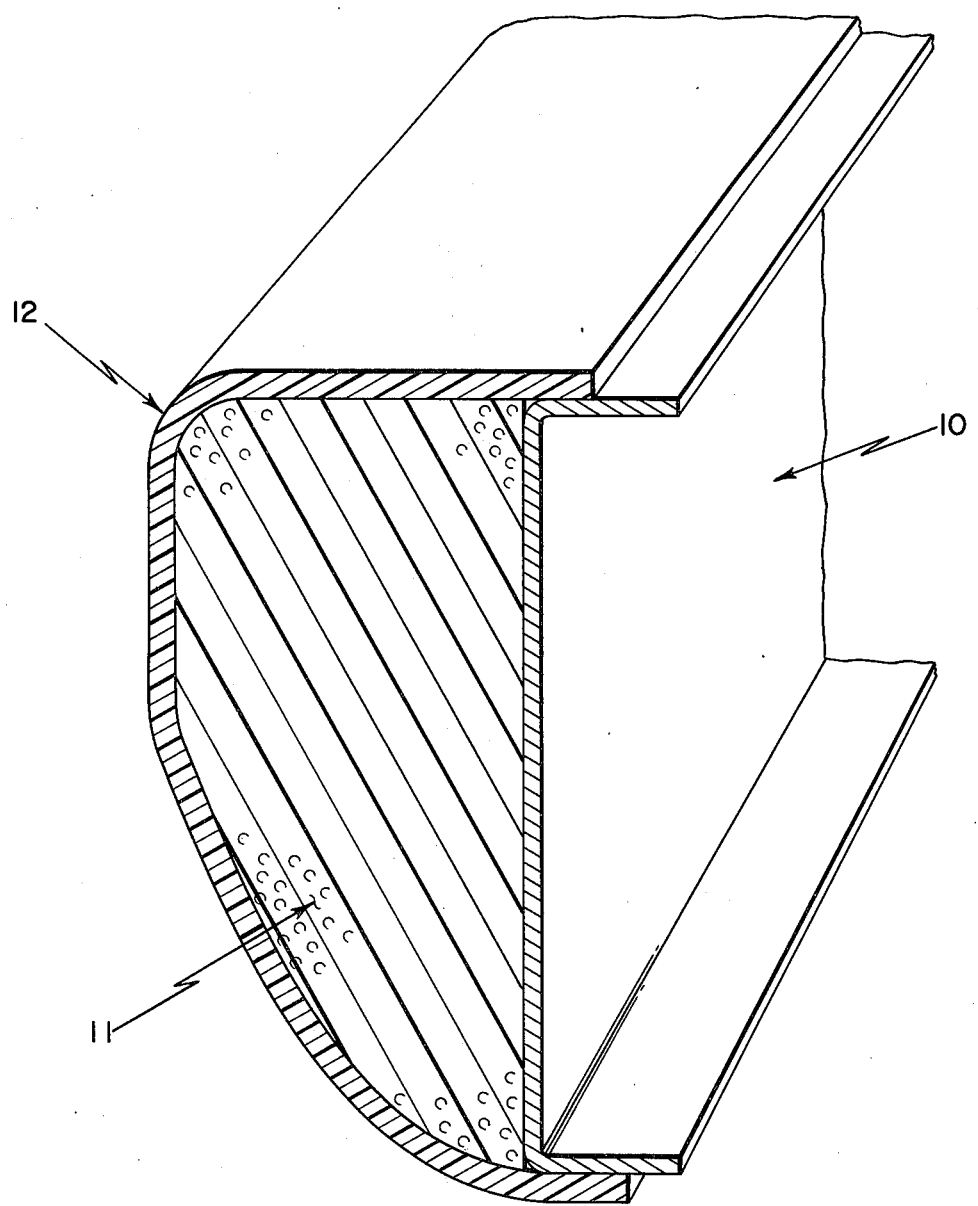

IMPACT ENERGY-ABSORBING URETHANE FOAM

RELATED APPLICATION

This application is a continuation-in-part of an earlier filed application Ser. No. 481,498, by the present inventor and having the same title and filed June 21, 1974, now abandoned.

INTRODUCTION

Urethane foams have been used for some years in automobile trim components, usually contained within a tough vinyl or ABS skin or shell, for styling purposes and as impact energy-absorbing safety padding. Recent efforts have been directed to the manufacture of urethane foam impact energy-absorbing automobile bumpers.

It has been known to water-blow flexible or semi-rigid urethane foams to very low densities, e.g. 3 to 5 lbs./ft.$^3$ and to use such low density urethane foams in automotive applications. However, until now, urethane foams of low densities have not performed well as impact energy-absorbing safety padding because, inter alia, they were too soft and, perhaps most important in automotive applications, did not give relatively constant performance over the wide range of temperatures encountered in service, i.e. the performance of the foams were quite temperature sensitive.

THIS INVENTION

This invention is concerned with a quite effective impact energy-absorbing urethane foam of relatively low density, less than 20 lbs./ft.$^3$, that is characterized by its temperature insensitivity and is particularly suited for automotive applications.

This foam has a reasonably good specific energy absorption, at least 25 in.-lbs./in.$^3$ and an efficiency therefore greater than 50% at any temperature in the range of −20°F. to 140° F. The outstanding property of the foam is its load/temperature index value or its temperature insensitivity. The 50% compression/deflection (C/D hereafter) value of the foam at −20° F. compared to this value at 140° F. differs by a factor of less than 2.5.

The low density foam of this invention is made from an aromatic diisocyanate propolymer system, water-blown (as opposed to hydrofluorocarbon blown), inside of a closed mold. The foam of this invention is not self-skinning. The amount of water used for blowing is relatively large, greater than 1.0 weight percent in all cases, which increases hardness. This amount of water produces, of course, a large amount of short-chain urea linkages which probably, in part, contribute to the improved performance of the foam. An amine or glycol crosslinker is used to improve moldability and to further increase hardness.

The base polymer polyol used in the foam formulation is specifically a reaction product or copolymer of 2 to 6 parts by weight of a poly ($C_1$–$C_4$ oxyalkylene) triol and one part by weight of an olefinic $C_2$–$C_6$ nitrile/vinyl aromatic monomer mixture. The polymer has a molecular weight in the range of 4000 to 8000. See Belgian Patent to Union Carbide Corporation, 270 Park Avenue, New York, N.Y., No. 788,115 (1973), especially Table VIII on page 38, polyols "D" and "IX" and also U.S. Pat. Nos. 3,304,273; 3,383,351; and 3,418,354.

The use of water alone as a crosslinker in the foam formulation may result in a foam that is too "wild" to be formed in a closed mold. In any event, foams have been prepared from the same ingredients except without the use of an organic crosslinker and with a slightly higher water content, 2.9%, and were found to be of too low of a specific energy to be of interest. Therefore, a glycol crosslinker is used in addition to the water. The crosslinker has a relatively low molecular weight, a functionality in the range of 2 to 6 and an equivalent weight in the range of 5 to 150. Preferably the crosslinker is selected from the group consisting of pentaerythritol, triethanolamine and a sorbitol polyether.

The foam is prepared by the prepolymer method. The aromatic diisocyanate, preferably methylene bis (4-phenyl isocyanate) (MDI) or toluene diisocyanate (TDI), is reacted with a polyol selected from the group consisting of 100 to 1000 molecular weight triols and 100 to 200 molecular weight ether glycols, e.g. diethylene or dipropylene glycol. The prepolymer has a FNCO (free isocyanate) content of 20 to 35% and is used in an amount to give an isocyanate index in the range of 90 to 115%.

The following is the preferred ranges of the ingredients:

|  | Parts by Weight |
|---|---|
| Polyol | 70 to 90 |
| Crosslinker | 10 to 30 |
| Water | 1 to 5 |
| Prepolymer | To yield 90–115% Index |
| Catalyst | 0 to 2 |

A similar foam has been prepared from about the same ingredients by the one-shot method but this foam had physical properties, principally specific energy, lower than that desired.

A conventional organo-heavy metal or tertiary amine catalyst, such as dibutyl tin dilaurate, stannous octocate or Dabco (triethylene diamine), is used as required.

Besides the above specific energy absorption and low temperature performance of the foam, the foam has reasonably good elongation, generally greater than 50% and reasonably good tensile strength, greater than 75 psi.

THE DRAWINGS

The drawing is a cross-sectional view of an automobile bumper incorporating the impact energy absorbing foam of this invention, such as might be used on a 1974 Ford Mustang or a 1974 Pontiac Firebird.

Referring to the drawing, the bumper consists of a rigid metal channel 10 mounted to the car frame (not shown) to which is adhesively secured a molded bun 11 of the urethane foam of this invention. A protective-decorative flexible skin of a denser plastic 12 overlays the foam. This can be a cast vinyl skin or vacuum formed ABS sheet, but preferably is a molded microcellular self-skinning urethane foam 0.150 inches thick. The urethane foam bun is, of course, placed in a position to receive the impact when the vehicle contacts other objects. The urethane foam bun has, as a rule, greater than 90% recovery at 70° F. even after multiple impacts in the same area such that the residual deformation in the bumper surface is not too unsightly.

EXAMPLES I-III

The two formulations of Table I illustrate this invention:

TABLE I

| Formulation: | I | II |
|---|---|---|
| * Polyol[(1)] | 75.0 | 75.0 |
| * Crosslinker: | | |
| Pentaerythritol | 25.0 | — |
| Sorbitol polyether[(2)] | — | 25.0 |
| * $H_2O$ | 4.0 | 4.0 |
| * TDI prepolymer[(3)] | 96.0 | 82.7 |
| * Catalyst-triethylene diamine | 0.8 | 0.8 |
| Properties:[(4)] | | |
| * Specific Energy (in.-lb./in.$^3$) | 31.1 | 27.0 |
| * 50% C/D-lbs. | | |
| at $-20°$ F | — | 1850 |
| at 140° F | 830 | 960 |
| at 70° F | 1325 | 1160 |
| Temperature Index | — | 1.92 |
| * Density, lbs./ft. | 5 | 5 |

Notes:
[(1)]a 6000 molecular weight copolymer of (a) four parts by weight of a 4500 molecular weight poly [oxypropylene (85%)–ethylene (15%)] triol reacted with (b) one part by weight of a 50/50 weight ratio acrylonitrile/styrene monomer mixture, Union Carbide Chemicals Co. NIAX 34-28 (See Polyol D of Table VIII of the Belgian patent, supra).
[(2)]BASF Wyandotte Corporation (Wyandotte, Michigan 48192) PA 14635 sorbitol polyether. It has 6 reactive hydrogens per molecule and an equivalent weight of 115.
[(3)]a quasi-prepolymer of acidified 80/20 TDI and of a polyether triol of 259 molecular weight, Union Carbide Chemical Co.'s LG-650. The prepolymer has a molecular weight of 298 and a free isocyanate content of 31. The prepolymer is made by simple mixing of ingredients and allowing the mixture to exotherm.
[(4)]4" × 4" × 2" samples were prepared for testing by simple blender mixing of the ingredients in a cup, pouring the blend in a mold, closing the mold and allowing the foaming reaction to go to completion for about six minutes.

As here used "specific energy" is a measure of the foam's ability to absorb energy and is defined as the area under the load curve of a sample tested in compression as on an Instron Tester. The values are given in inch-pounds/cubic inch at 50% deflection, in.-lb./in.$^3$ (50% CD), and are determined as follows: A 4×4 ×2 inch thick block is compressed at 2 inches /min. to 50% CD and the stress/strain plot recorded on graph paper. The area between the loading curve and the horizontal axis is the specific energy. Ideally, this curve would be square-form. The "efficiency" of the foam is ratio of the specific energy of the foam over the area of ideal square-form wave.

The temperature index is obtained in accordance with ASTM-2406 except that the test is run at the indicated temperatures, not at 70° F. as is usual, and the compression/deflection at the lower temperature is divided by that at the higher temperature to obtain the factor by which they differ.

The above foams shown in the above examples have free blow densities of 2.5 to 3.0 lbs./ft.$^3$ but are blown in closed molds to densities of 5 to 20 lbs./ft.$^3$. The pack factor, i.e. molded density/free blown density, is preferably in the range of 1.5 to 8.

EXAMPLE III

EXAMPLE III

| | Parts by Weight |
|---|---|
| Polyol | 75.0[(1)] |
| Crosslinker | 25.0[(2)] |
| Water | 1.5 |
| Triethylene diamine | 0.8 |
| MDI Prepolymer | 70.2[(3)] |
| Blowing Agent | 0 |

[(1)]NIAX 31-28 (Union Carbide).
[(2)]Sorbitol Polyether (Wyandotte).
[(3)]E-451 (Mobay Chemical Company, Division of Baychem Corp., Pittsburgh, Pennsylvania 15205). This is a 50/50 blend of Mobay's Mondur PF and Mondur CD. It has a FNCO of about 27-28 and is a linear polymer with a high degree of aromaticity. Mondur PF is a tripropylene glycol adduct of MDI. Mondur CD is a "liquid" or modified MDI that contains a small amount of some trimers and carbodiimides which disrupt the symmetry and inhibit the crystallization of the final prepolymer molecule and help keep the mixture liquid, which is a convenience. Isonate 143L (Upjohn Company, Industrial Chemicals Division, North Haven, Connecticut 06473) is the rough equivalent of Mondur CD.

The foam is made by simply blending the ingredients as in a mixing head at room temperature. The foam has a cream time of 24 seconds, a rise time of 76 seconds, and is tack free in 145 seconds. Its free blown density is 4.55 lbs./ft.$^3$ A fluorohydrocarbon blowing agent can be used to reduce and control the molded density.

What is claimed is:

1. An impact energy-absorbing urethane foam made from the following formulation:

| | Parts by Weight |
|---|---|
| Polymer Polyol | 70 to 90 |
| Cross linker | 10 to 30 |
| Water | 1 to 5 |
| Prepolymer | To yield 90–115% Index |
| Catalyst | 0 to 2 | wherein:
said polymer polyol having a molecular weight in the range of 4000 to 8000 and comprising in the range of 2 to 6 parts of a poly ($C_1$–$C_4$ oxyalkylene) triol reacted with one part of a vinyl aromatic/olefinic $C_2$–$C_6$ nitrile monomer mixture;
said crosslinker is a polyol having a functionality in the range of 2 to 6 and an equivalent weight in the range of 50 to 150;
said prepolymer is a reaction product of (a) an aromatic diisocyanate selected from the group consisting of MDI and TDI and (b) a polyol selected from the group consisting of a 100 to 1000 molecular weight triol and a 100 to 200 molecular weight ether glycol and has a free isocyanate content in the range of 20 to 35 percent; and
said urethane foam being prepared in a closed mold at a pack factor in the range of 1.5 to 8 and having a density in the range of 5 to 20 lbs./ft.$^3$, a specific energy at 50% C/D greater than 25 in.-lbs./in.$^3$, a temperature index $-20°/140°$ F. of less than 2.5 and at least 90% recovery at 70° F. after multiple impact.

2. The urethane foam of claim 1 wherein:
said polymer polyol is a 6000 molecular weight copolymer of a poly (oxypropylene-ethylene) triol reacted with a 50/50 styrene/acrylonitrile monomer mixture;
said crosslinker is selected from the group consisting of a sorbitol polyether having 6 reactive hydrogens and an equivalent weight of 115 and pentaerythritol;
said prepolymer is the reaction product of acidified TDI and a polyether triol of about 259 molecular weight and has a free isocyanate content of about 31; and
said catalyst is triethylene diamine.

3. The urethane foam of claim 1 wherein said prepolymer is the reaction product of MDI and a polyether triol.

* * * * *

UNITED STATES PATENT OFFICE
CERTIFICATE OF CORRECTION

PATENT NO. : 4,116,893
DATED : September 26, 1978
INVENTOR(S) : Kirby E. L. Flanagan It is certified that error appears in the above-identified patent and that said Letters Patent are hereby corrected as shown below:

Column 1, line 46, "propolymer" should be --prepolymer--.

Column 1, line 59, "($C_1$-$C_4$ oxyalkylene)" should be --($C_2$-$C_4$ oxyalkylene)--.

Column 2, line 37 "stannous octocate" should be --stannous octoate--.

Column 3, line 60, cancel "EXAMPLE III" first occurrence.

Column 4, Claim 1, line 33, "($C_1$-$C_4$ oxyalkylene)" should be --($C_2$-$C_4$ oxyalkylene)--.

Column 4, Claim 2, line 57, "sorbitoi" should be --sorbitol--.

Signed and Sealed this

Twelfth Day of June 1979

[SEAL]

Attest:

RUTH C. MASON
Attesting Officer

DONALD W. BANNER
Commissioner of Patents and Trademarks